US009886936B2

(12) United States Patent
Steinberger et al.

(10) Patent No.: US 9,886,936 B2
(45) Date of Patent: *Feb. 6, 2018

(54) PRESENTING PANELS AND SUB-PANELS OF A DOCUMENT

(75) Inventors: David Timothy Steinberger, Astoria, NY (US); Cyrus Najmabadi, New York, NY (US)

(73) Assignee: Amazon Technologies, Inc., Las Vegas, NV (US)

( * ) Notice: Subject to any disclaimer, the term of this patent is extended or adjusted under 35 U.S.C. 154(b) by 289 days.

This patent is subject to a terminal disclaimer.

(21) Appl. No.: 12/780,838

(22) Filed: May 14, 2010

(65) Prior Publication Data

US 2010/0318895 A1 Dec. 16, 2010

Related U.S. Application Data

(60) Provisional application No. 61/216,383, filed on May 14, 2009.

(51) Int. Cl.
| | |
|---|---|
| *G06F 17/00* | (2006.01) |
| *G09G 5/34* | (2006.01) |
| *G06F 3/0481* | (2013.01) |
| *G06F 3/147* | (2006.01) |

(52) U.S. Cl.
CPC ............ *G09G 5/34* (2013.01); *G06F 3/0481* (2013.01); *G06F 3/147* (2013.01); *G06F 2203/04806* (2013.01); *G09G 2340/045* (2013.01); *G09G 2340/0407* (2013.01); *G09G 2340/145* (2013.01); *G09G 2370/027* (2013.01); *G09G 2380/14* (2013.01)

(58) Field of Classification Search
None
See application file for complete search history.

(56) References Cited

U.S. PATENT DOCUMENTS

| | | | | |
|---|---|---|---|---|
| 5,707,288 A | * | 1/1998 | Stephens | ................... 463/33 |
| 5,856,821 A | * | 1/1999 | Funahashi | ................ 345/667 |

(Continued)

FOREIGN PATENT DOCUMENTS

| | | | | | |
|---|---|---|---|---|---|
| JP | 2003122473 | | * | 4/2003 | |
| WO | WO 2007/091081 | | * | 8/2007 | ............... G06T 7/00 |

OTHER PUBLICATIONS

Tometer, August; "Optimizing Your Website for Mobile Safari"; Nov. 2007; Addison-Wesley; pp. 4-6.*

(Continued)

*Primary Examiner* — Asher Kells
(74) *Attorney, Agent, or Firm* — Lee & Hayes, PLLC

(57) ABSTRACT

Systems, methods, and media for presenting panel-based electronic documents are provided. In accordance with some embodiments, systems for presenting panel-based electronic documents are provided, the systems comprising: at least one processor programmed to: receive an electronic document, a definition of a first panel on a page in the electronic document, and a definition of a second panel on the page in the electronic document; control a display of the first panel based on the definition of the first panel; and transition from the display of the first panel to a display of the second panel by re-scaling the display and panning from the first panel to the second panel.

23 Claims, 14 Drawing Sheets

(56) References Cited

U.S. PATENT DOCUMENTS

| | | | |
|---|---|---|---|
| 2003/0043215 A1* | 3/2003 | Nomura | G06F 3/0481 |
| | | | 715/864 |
| 2008/0059481 A1* | 3/2008 | Kunimatsu | H04N 7/17309 |
| 2008/0077857 A1* | 3/2008 | Olson | 715/246 |
| 2008/0094370 A1* | 4/2008 | Ording et al. | 345/173 |
| 2008/0174570 A1* | 7/2008 | Jobs | G06F 3/0488 |
| | | | 345/173 |
| 2010/0315315 A1* | 12/2010 | Osborne | 345/1.3 |
| 2011/0032183 A1* | 2/2011 | Murphey | 345/156 |
| 2012/0210259 A1* | 8/2012 | Bederson et al. | 715/765 |
| 2014/0033084 A1* | 1/2014 | Eismann | G06F 8/38 |
| | | | 715/763 |

OTHER PUBLICATIONS

McFarland, David Sawyer; "JavaScript: The Missing Manual"; Jul. 2008; O'Reilly; pp. 254-258.*

Office action for U.S. Appl. No. 14/959,875, dated Oct. 4, 2016, Steinberger et al., "Systems, Methods, and Media for Presenting Panel-Based Electronic Documents", 16 pages.

Office action for U.S. Appl. No. 14/959,875, dated Mar. 28, 2016, Steinberger et al., "Systems, Methods, and Media for Presenting Panel-Based Electronic Documents", 13 pages.

* cited by examiner

PRESENTING PANELS AND SUB-PANELS OF A DOCUMENT

CROSS REFERENCE TO RELATED APPLICATION

This application claims the benefit of U.S. Provisional Patent Application No. 61/216,383, filed May 14, 2009, which is hereby incorporated by reference herein in its entirety.

TECHNICAL FIELD

The disclosed subject matter relates to systems, methods, and media for presenting panel-based electronic documents.

BACKGROUND

With the continued proliferation of portable electronic devices, there is a continued growth in the demand for mechanisms to view electronic documents, such as books, newspapers, magazines, comic books, etc.

Certain forms of electronic documents, such as comic books, include content in a layout that has multiple panels of content for each page. For example, with comic books, a top-left-most panel on a page may represent a first panel for the page, and the bottom-right-most panel of the page may represent a last panel for the page. By viewing and reading these panels from the top-left toward the bottom-right, a reader can observe a time-sequence of events in the comic books story line.

Current electronic document reading mechanisms do not adequately facilitate reading of such panel-based electronic documents, and therefore new mechanisms for presenting such electronic documents are desirable.

SUMMARY

Systems, methods, and media for presenting panel-based electronic documents are provided. In accordance with some embodiments, systems for presenting panel-based electronic documents are provided, the systems comprising: at least one processor programmed to: receive an electronic document, a definition of a first panel on a page in the electronic document, and a definition of a second panel on the page in the electronic document; control a display of the first panel based on the definition of the first panel; and transition from the display of the first panel to a display of the second panel by re-scaling the display and panning from the first panel to the second panel.

In accordance with some embodiments, methods for presenting panel-based electronic documents are, provided, the methods comprising: receiving an electronic document, a definition of a first panel on a page in the electronic document, and a definition of a second panel on the page in the electronic document; controlling a display of the first panel based on the definition of the first panel; and transitioning from the display of the first panel to a display of the second panel by re-scaling the display and panning from the first panel to the second panel.

In accordance with some embodiments, computer-readable media containing computer-executable instructions that, when executed by a processor, cause the processor to perform a method for presenting panel based electronic documents, the method comprising: receiving an electronic document, a definition of a first panel on a page in the electronic document, and a definition of a second panel on the page in the electronic document; controlling a display of the first panel based on the definition of the first panel; and transitioning from the display of the first panel to a display of the second panel by re-scaling the display and panning from the first panel to the second panel.

DETAILED DESCRIPTION

In accordance with various embodiments, mechanisms for presenting panel-based electronic documents are provided. These mechanisms can be used in a variety of applications such as to allow for viewing and reading panel-based documents, such as comic books, on portable electronic devices, such as mobile phones, portable media players, e-readers, tablet computing devices, laptop computers, non-portable devices and computers, etc.

Figure 1:
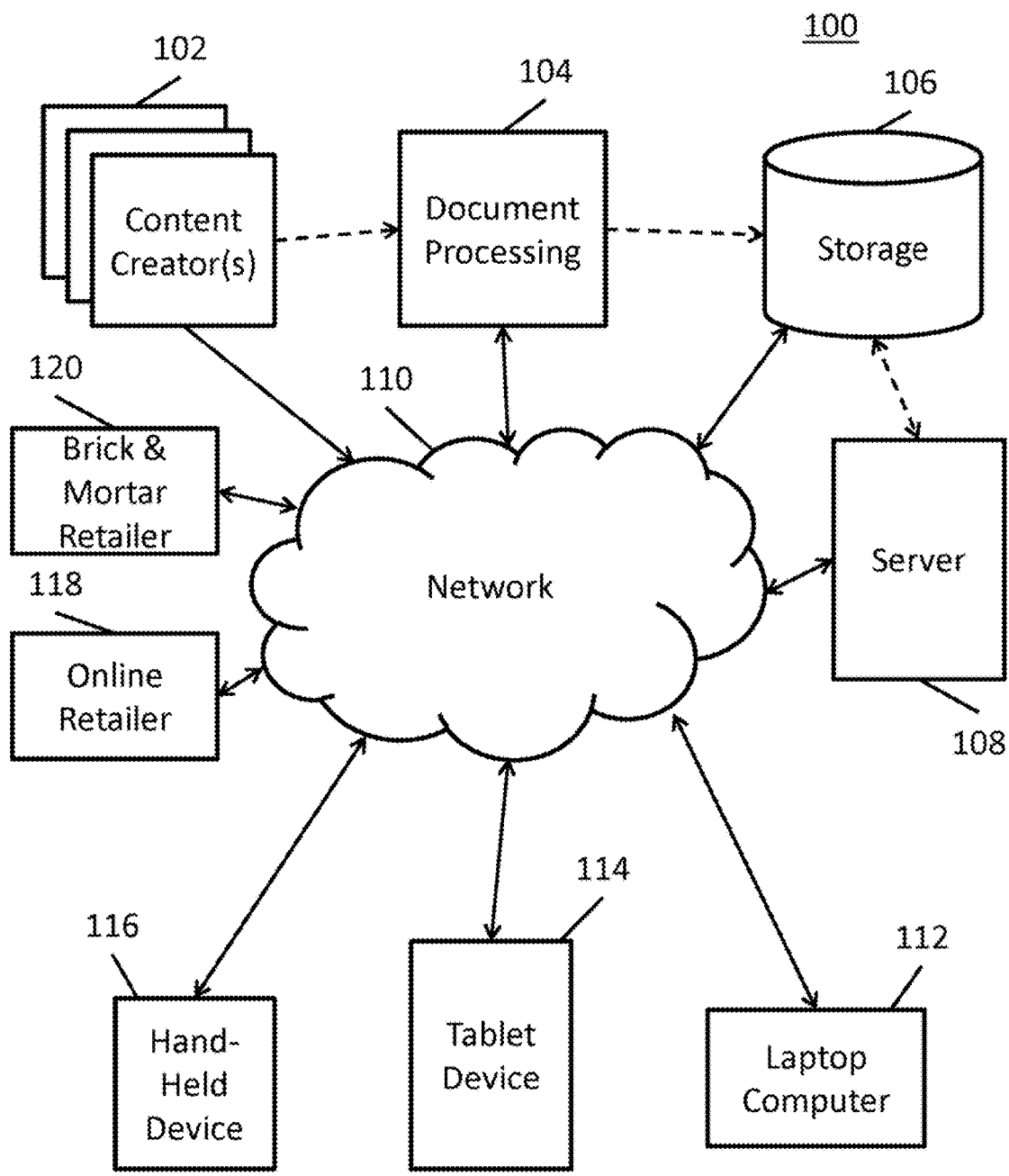
FIG. 1 is a diagram of hardware that can be used in some embodiments.

Turning to FIG. 1, an example of hardware 100 that can be used in some embodiments is illustrated. As shown, hardware 100 includes content creator computers 102, document processors 104, storage 106, a server 108, a communication network 110, reading devices 112, 114, and 116 (such as a laptop computer 112, a tablet computing device 114, and a handheld device 116), online retailer 118, and a brick and mortar retailer 120.

In some embodiments, a panel-based electronic document may first be created by content creators on content creator computers 102 or created on paper and then transferred to content creator computers 102 (e.g., by scanning the document). These documents may be provided on computers 102 in any suitable format, such as ADOBE PORTABLE DOCUMENT FORMAT (PDF), bitmap, JPEG, etc.

The document can then be transferred to a document processor 104 directly or via network 110. Any suitable protocol for transferring the document can be used in some embodiments. For example, the document can be transferred using the TCP/IP protocol.

At the document processor 104, the document can be processed to define various parts of the document as described further below in accordance with some embodiments. This can result in a definition file, such as an XML file, for the document being created in accordance with some embodiments.

The electronic document and/or the definition file can then be stored in storage 106 in some embodiments. Any suitable mechanism for storing the electronic document and/or the definition file can be used. For example, the electronic document and/or definition file can be stored in database (such as database hardware and/or software), a mass storage device (such as a disk drive, an optical drive, magnetic media, memory, etc.), etc.

Server 108 can then access the electronic document and/or definition file and make them accessible to users using reading devices 112, 114, and/or 116 via communication network 110. Users can access the electronic documents and/or the definition file as described below in accordance with some embodiments.

Any suitable server 108 can be used in some embodiments. For example, server 108 can be an Internet server that can communicate with the reading devices and/or storage 106.

Any suitable network and/or combination of networks may be used as network 110 in some embodiments. For example, network 110 may include the Internet, a wired network, a wireless network, a local area network, a wide area network, a telephone network, a cable network, a satellite network, a fiber optic network, etc. In some embodiments, network 110 can include any suitable equipment such as routers, firewalls, servers, proxy servers, gateways, etc.

Reading devices 112, 114, and 116 can be any suitable devices such as a laptop computer 112, a tablet computing device 114, and a handheld device 116, mobile phones, portable media players, e-readers, tablet computing devices, laptop computers, non-portable devices and computers, etc.

As described below, in some embodiments, a user can use a reading device 112, 114, or 116 to purchase a paper copy of an electronic document. For example, a user can use the reading device to purchase a paper copy of an electronic comic book. This purchase can be facilitated in some embodiments via online retailer 118 and/or brick and mortar retailer 120. Any suitable equipment, such as a Web server can be located at the retailer 118 and/or 120.

Any suitable components in hardware 100, such as content creator computers 102, document processors 104, storage 106, server 108, reading devices 112, 114, and 116, online retailer 118, and a brick and mortar retailer 120, can be implemented in one or more general purpose devices such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc., and can be configured to operate in response to software instructions consistent with the functionality described herein.

Figure 2:
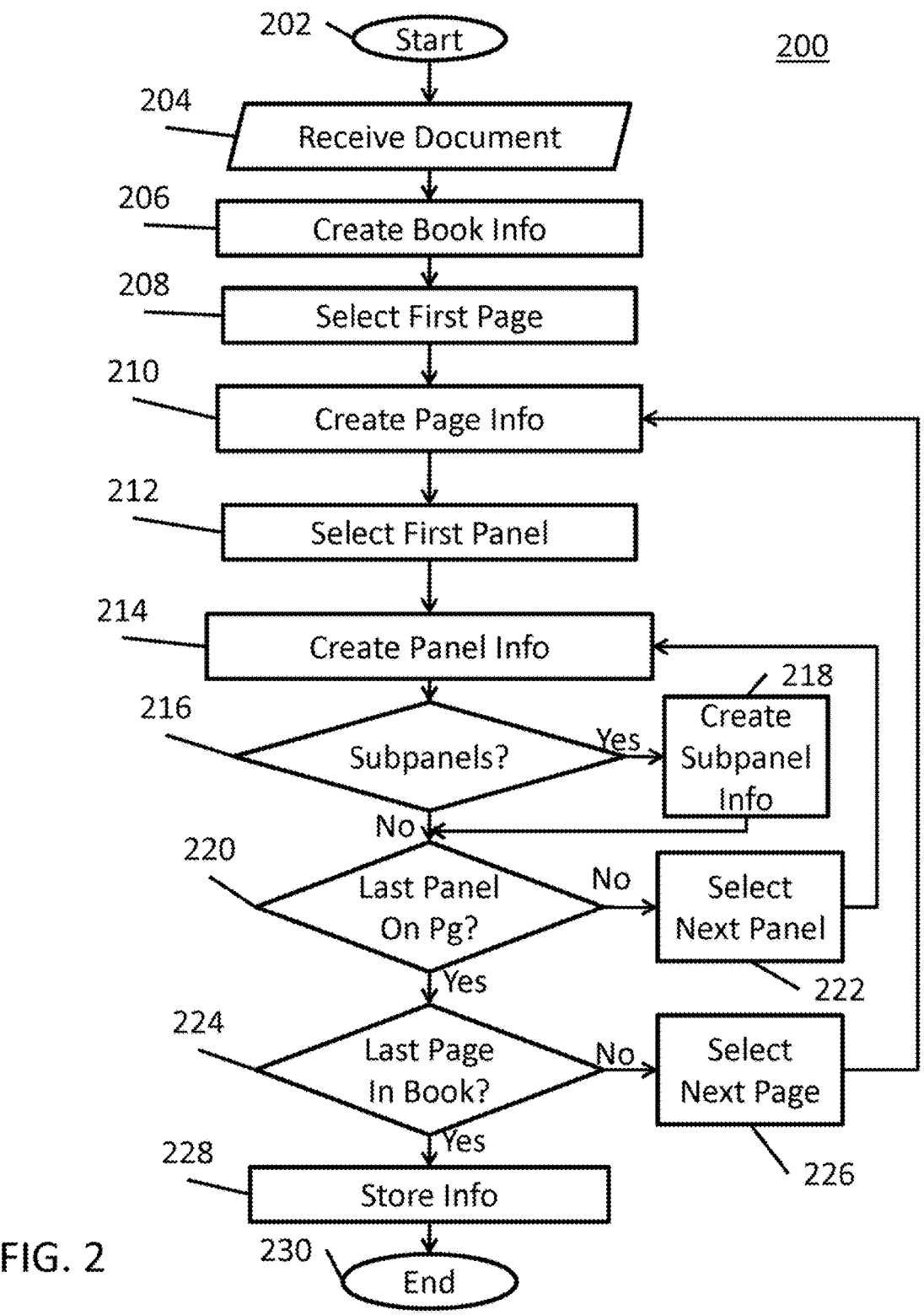
FIG. 2 is a diagram of a process for creating a definition file in accordance with some embodiments.
Figure 3:
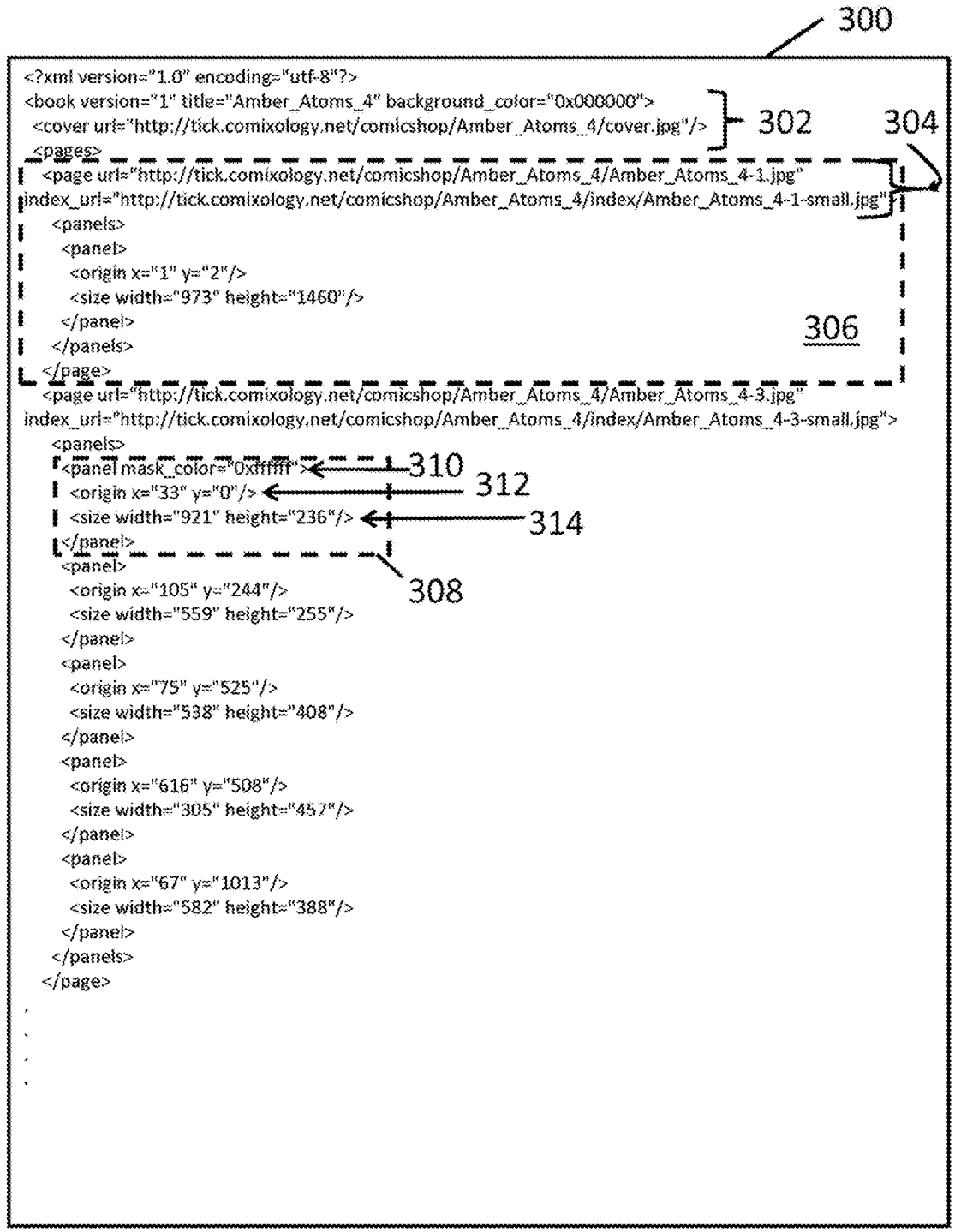
FIG. 3 is a diagram of an example of a definition file in accordance with some embodiments.

As mentioned above, in some embodiments, document processor 104 can be used to create a definition file for an electronic document. An example of a process 200 for creating a definition file that can be used in some embodiments is illustrated in FIG. 2. An example of a definition file 300, in XML format, that can be used in some embodiments is shown in FIG. 3.

As can be seen from FIG. 2, after process 200 begins at 202, the process can receive an electronic document. The document can be received using any suitable mechanism. For example, the document can be received via network 110 from content creator computers 102 or directly from the content creator computers 102.

Next, at 204, process 200 can create book information for the definition file. For example, as shown in FIG. 3 at 302, the book information can define a version, a title, and a background color for the book as well as a cover image. Any other suitable book information can additionally or alternatively be defined.

After defining the book information, process 200 can select the first page of the book at 208. The first page of the book can be selected on any suitable basis. For example, the first book can be selected as the first page following the front cover in a corresponding paper form of the electronic book.

Page information for the selected page can next be created at 210. For example, as shown in FIG. 3 at 304, page information can define a page file for the page and an index file for the page. Any other suitable page information can additionally or alternatively be defined. The page information can also include panel information corresponding to the page (as shown in 306 of FIG. 3).

Next, at 212, process 200 can select the first panel on the page. The first panel on the page can be selected on any suitable basis. For example, the first panel can be selected as the panel in the top-left-most position on the page.

At 214, panel information for the selected panel can next be created. For example, as shown in FIG. 3 at 306, the panel information can include a panel mask color, a panel origin (e.g., such as the upper, left corner of the panel), and a panel size (which can be specific in absolute terms (e.g., in number of pixels) or in relative terms (e.g., as a percentage of a page), for example). Any other suitable panel information can additionally or alternatively be defined. For example, one or more sound effects for a panel can be defined. Such sound effects could be played when the panel is displayed. As another example, a vibration option could be defined for a panel so that a reading device vibrates when a corresponding panel is displayed. As yet another example, a panel could be defined so that it is to appear as being shaking relative to a reading device when displayed.

Process 200 can next determine, at 216, whether any sub-panels are to be included for the panel. Subpanels can be used, in some embodiments, for example, to enable a portion of a panel to be highlighted when the panel is displayed.

Figure 14:
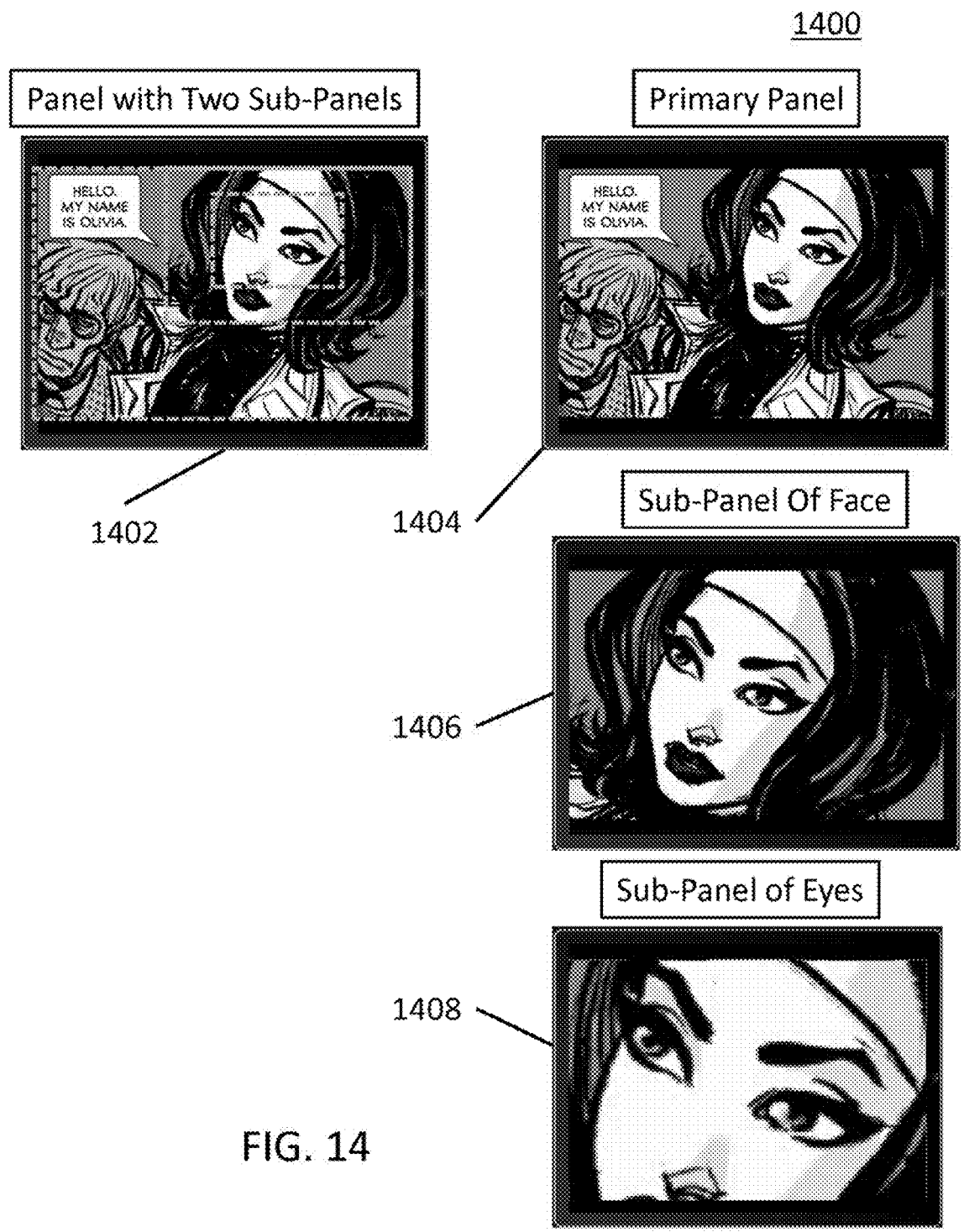
FIG. 14 is a diagram of an example of a panel and two sub-panels in accordance with some embodiments.

An example of subpanels 1400 is shown in FIG. 14. As illustrated in panel 1402, the panel can have two sub-panels—e.g., each an area within panel 1402. As shown the panel and sub-panels can be used to show the entire panel or some sub-portion of the panel. For example, as illustrated in FIG. 14, a panel may be used to show "Olivia" using 1404. For dramatic affect, it may be desirable to highlight Olivia's face using 1406 or Olivia's eyes using 1408.

If it is determined at 216 that one or more sub-panels are to be included, the sub-panel information can be created at 218. This sub-panel information can include any suitable information, such as the information described above for a panel in connection with 214.

After the sub-panel information has been created at 218, or if it is determined that no sub-panel information is to be included, then process 200 can determine whether the selected panel is the last panel on the page at 220. If the selected panel is determined to not be the last panel, then process 200 can select the next panel on the page (on any suitable basis) at 222 and loop back to 214.

Otherwise, if the selected panel is determined to be the last panel on the page, then, at 224, process 200 can determine whether the selected page is the last page in the book. If it is determined that the selected page is not the last page, then process 200 can select the next page (on any suitable basis) at 226 and loop back to 210.

Otherwise, if the selected page is determined to be the last page in the book, then, at 228, process 200 can store the information. The information can be stored in any suitable manner, such as by writing the information to an XML file (e.g., as illustrated in FIG. 3) and saving it to storage 106 of FIG. 1. Once the information has been stored, process 200 can end at 230.

The creation of a definition file for an electronic document could be performed based on manual input or fully automatically in some embodiments. For example, the definition of a panel could include receiving a user click on an origin for an electronic document's panel and a dragging of a rectangle around the panel. As another example, the border of a panel could be determined by automatically detecting the edges of a panel and creating a shape around the panel and/or finding the best fit for a rectangle around the panel.

In some embodiments, rather than have rectangular (or square) shapes as described herein, panels could be defined as having any suitable shape. Such panels could be defined using vectors, using bitmaps, using combinations of one or more geometric shapes, etc.

Figure 4:
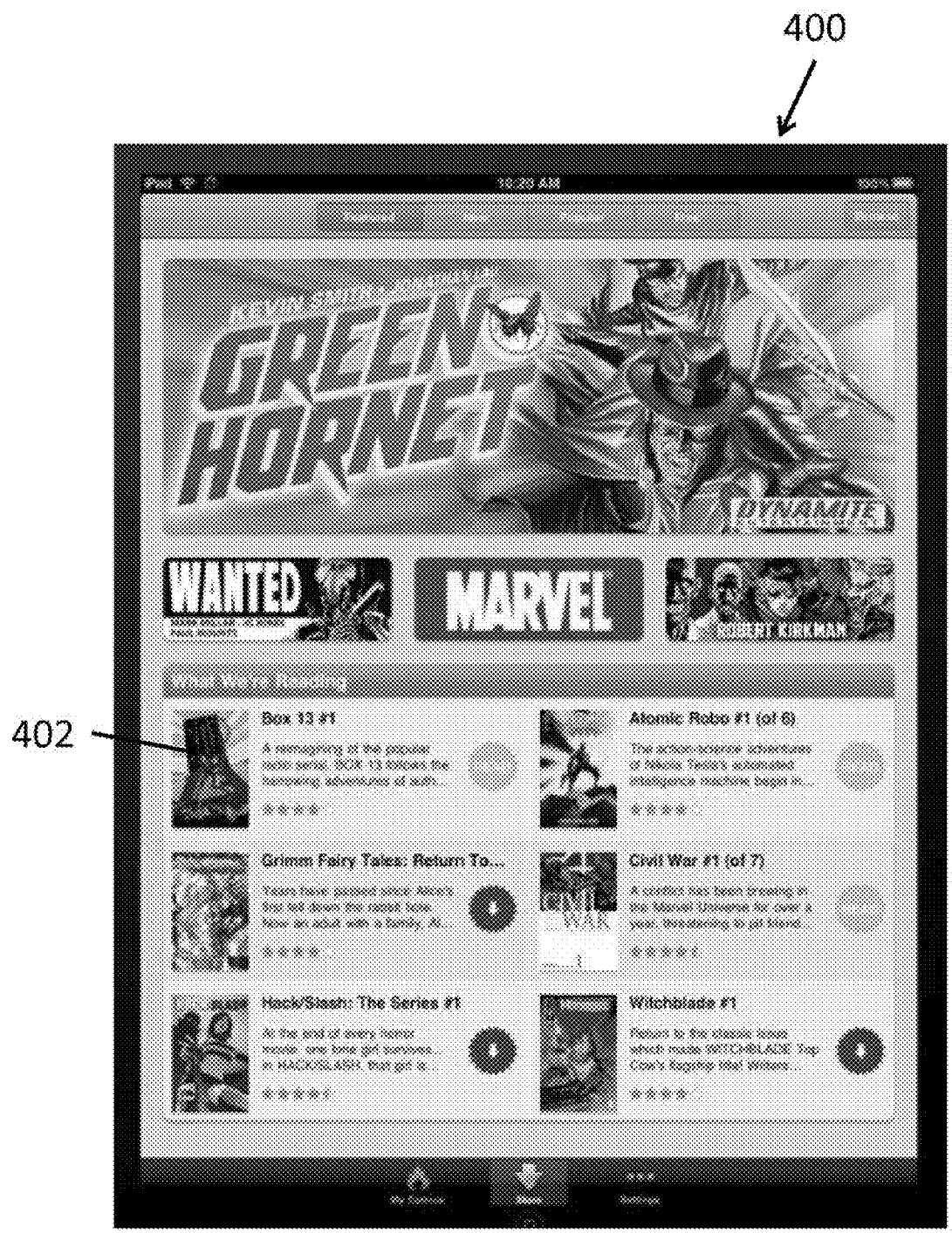
FIG. 4 is a diagram of an example of a title selection interface in accordance with some embodiments.

Turning to FIG. 4, an example of a user interface 400 for selecting an electronic document to be displayed in accordance with some embodiments is shown. As illustrated, this interface may include one or more titles 402 that a user can select for viewing. In some embodiments, after the user has selected a title, the user may be prompted for payment information, or pre-stored payment information may be accessed so that a payment for the title can be effected using the information.

Figure 5:
FIG. 5 is a diagram of another example of a title selection interface in accordance with some embodiments.

Another example of a user interface 500 for selecting an electronic document to be displayed in accordance with some embodiments is shown in FIG. 5. As illustrated, the interface can include a carousel of title 502 that can be quickly scrolled by user, and individual titles 504 that a user can select for purchase and/or viewing.

Figure 6:
FIG. 6 is a diagram of an example of an introductory display in accordance with some embodiments.

Once a user has selected a title for viewing (perhaps after purchasing the title), an introductory panel 600 for the title can be displayed as illustrated in FIG. 6. Any suitable introductory panel can be displayed and such panels can (and likely will) vary greatly from title to title.

Figure 7:
FIG. 7 is a diagram of an example of a multi-panel display in accordance with some embodiments.

Next, in some embodiments, a multi-panel page 700 may be displayed as shown in FIG. 7. This page may present multiple panels simultaneously so that a user can experience a similar feel to seeing a first page of a paper book when the previous page is turned. In some embodiments, a multi-panel display of a page when the first panel on the page is to be displayed can be disabled when desired.

Figure 8:
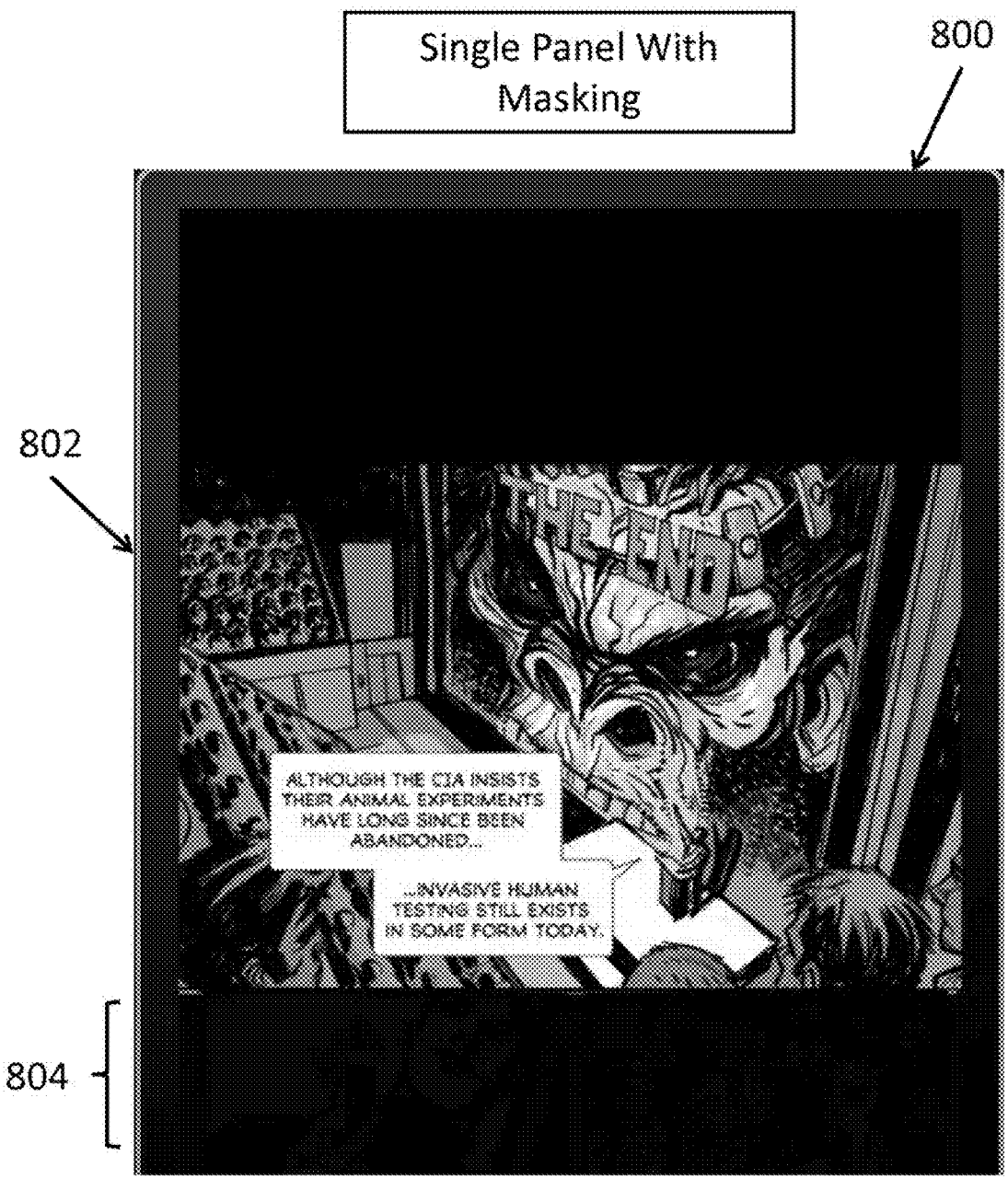
FIG. 8 is a diagram of an example of a panel with masking displayed in accordance with some embodiments.

As shown in display 800 of FIG. 8, when a panel 802 is to displayed (e.g., after a multi-panel page has been displayed), the displayed panel can include masking 804 to obscure adjacent panels of the corresponding page. This masking can be in a color specified in the definition file. For example, the masking color can be defined for a specific panel, for a page, or as a default for a book. In some embodiments, the mask can be a given level of transparency, can have a pattern, can disabled, and/or have any other suitable characteristic. The characteristics of the mask can be defined based on definitions of default mask characteristics at the book, page, panel, and/or sub-panel level.

Figure 9:
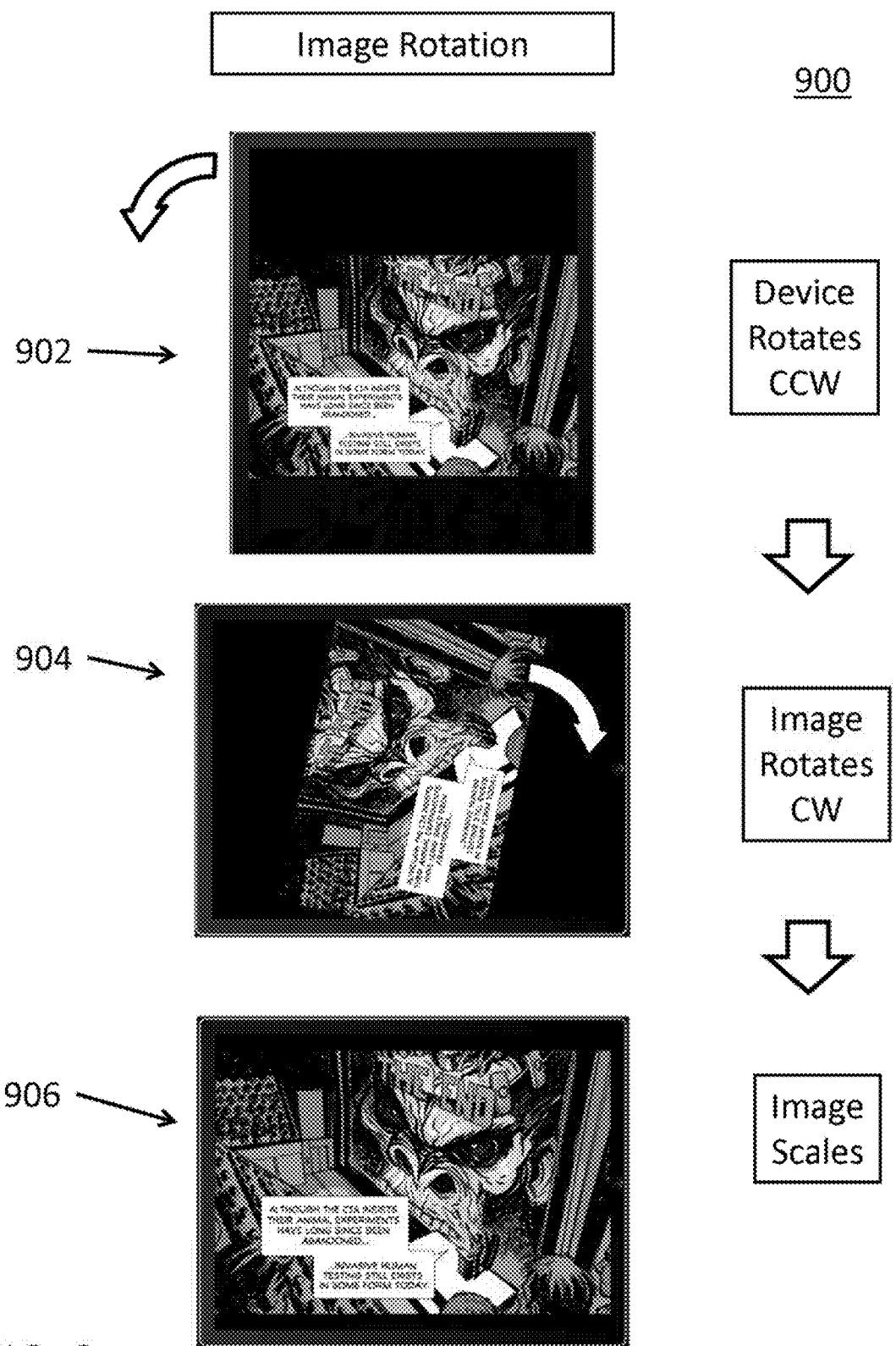
FIG. 9 is a diagram of a process for rotating an image in response to a device rotating in accordance with some embodiments.

As shown in series 900 of FIG. 9, in some embodiments, when a user rotates a compatible reading device, the orientation of the display can be adjusted to compensate. This may be desirable, for example, when a panel is best viewed in a landscape orientation and the user is holding a reading device in a portrait orientation. Thus, for example, as shown in FIG. 9, when a user rotates a reading device counter-clockwise at 902, a displayed image can automatically rotate clockwise in the device at 904 and scale to fit the new display orientation at 906. In some embodiments, a rotation of a panel being displayed can be performed even when the reading device has not been rotated.

Figure 10:
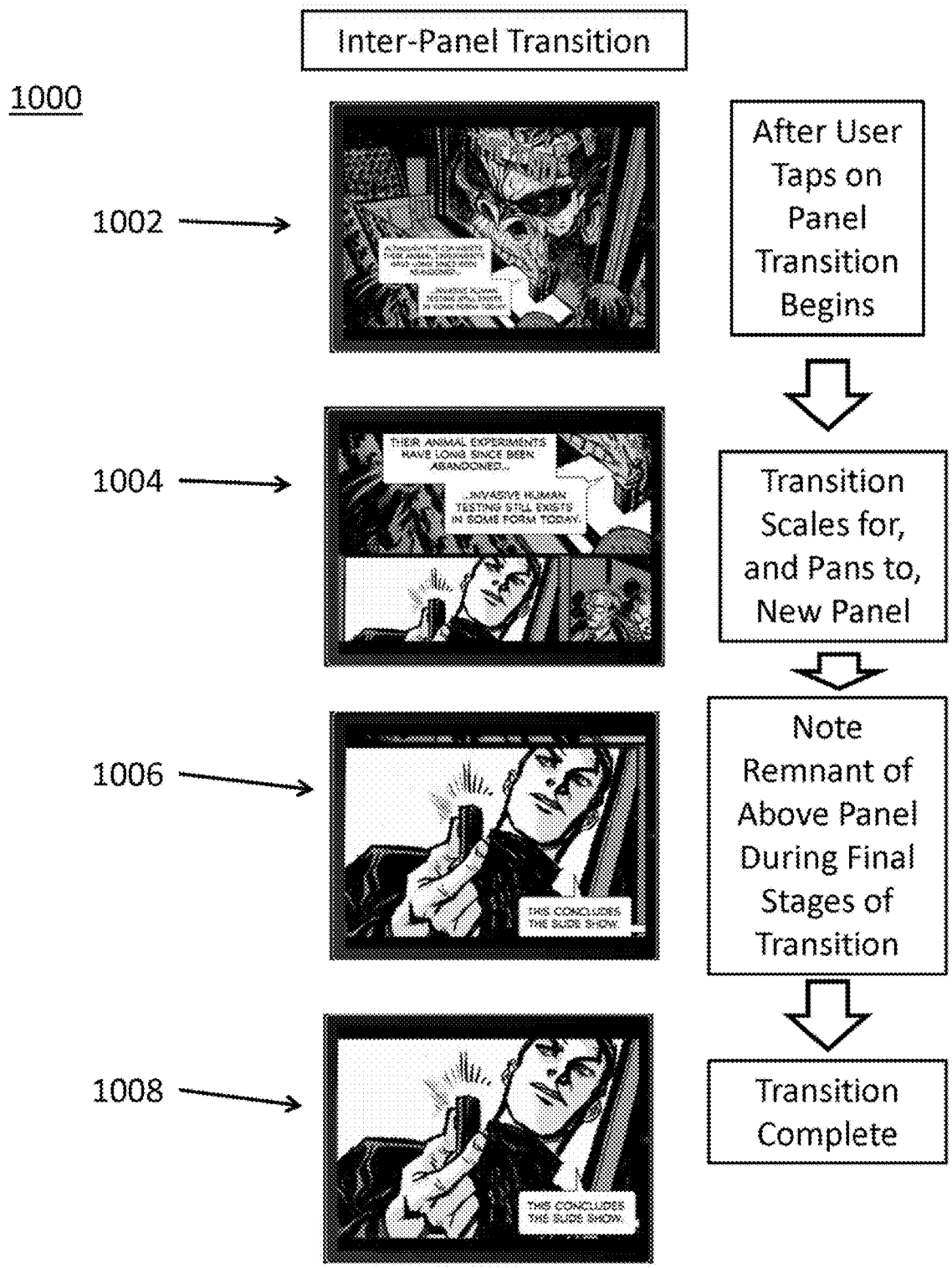
FIG. 10 is a diagram of an example of an inter-panel transition in accordance with some embodiments.

In some embodiments, after a user has viewed a panel, the user may initiate a transition to a new panel as shown, for example, by series 1000 of FIG. 10. As illustrated, at 1002, the user may tap on the displayed panel (or take any other suitable action). Next, at 1004, the display can scale to the new panel size and then begin to pan to the new panel on the corresponding page. As the panning progresses, a remnant of one or more adjacent panels may be visible prior to the panel being finally displayed as shown at 1006. Finally, after the transition is complete at 1008, the panel can be displayed with any specified masking, such as illustrated in connection with FIG. 8.

Figure 11:
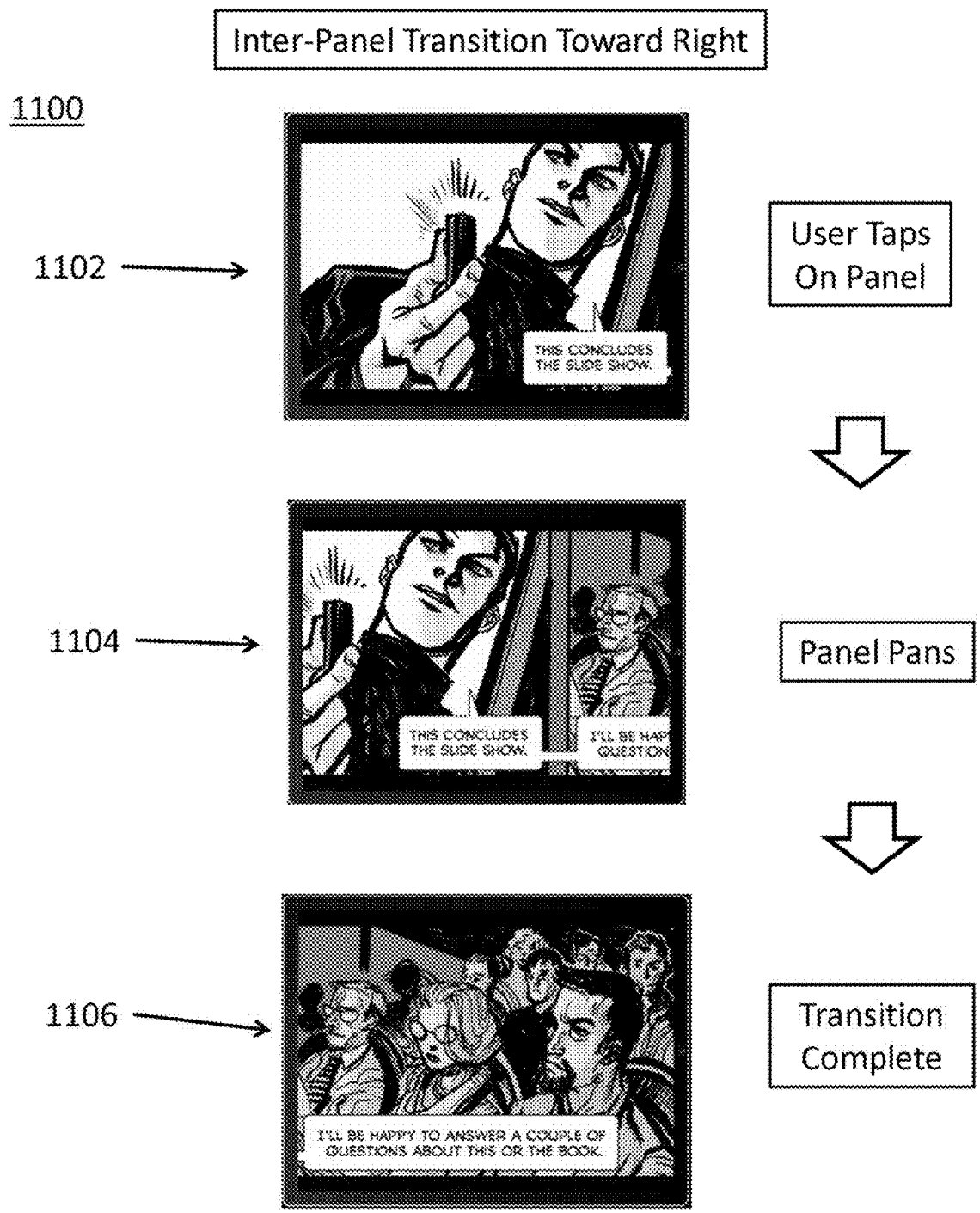
FIG. 11 is a diagram of another example of an inter-panel transition in accordance with some embodiments.

FIG. 11 illustrates another example of a series 1100 showing a panel transition in accordance with some embodiments. As show, after a user taps a panel at 1102, the panel scales to the new panel and pans toward the right on the page to shown the new panel at 1104 and then 1106.

Figure 12:
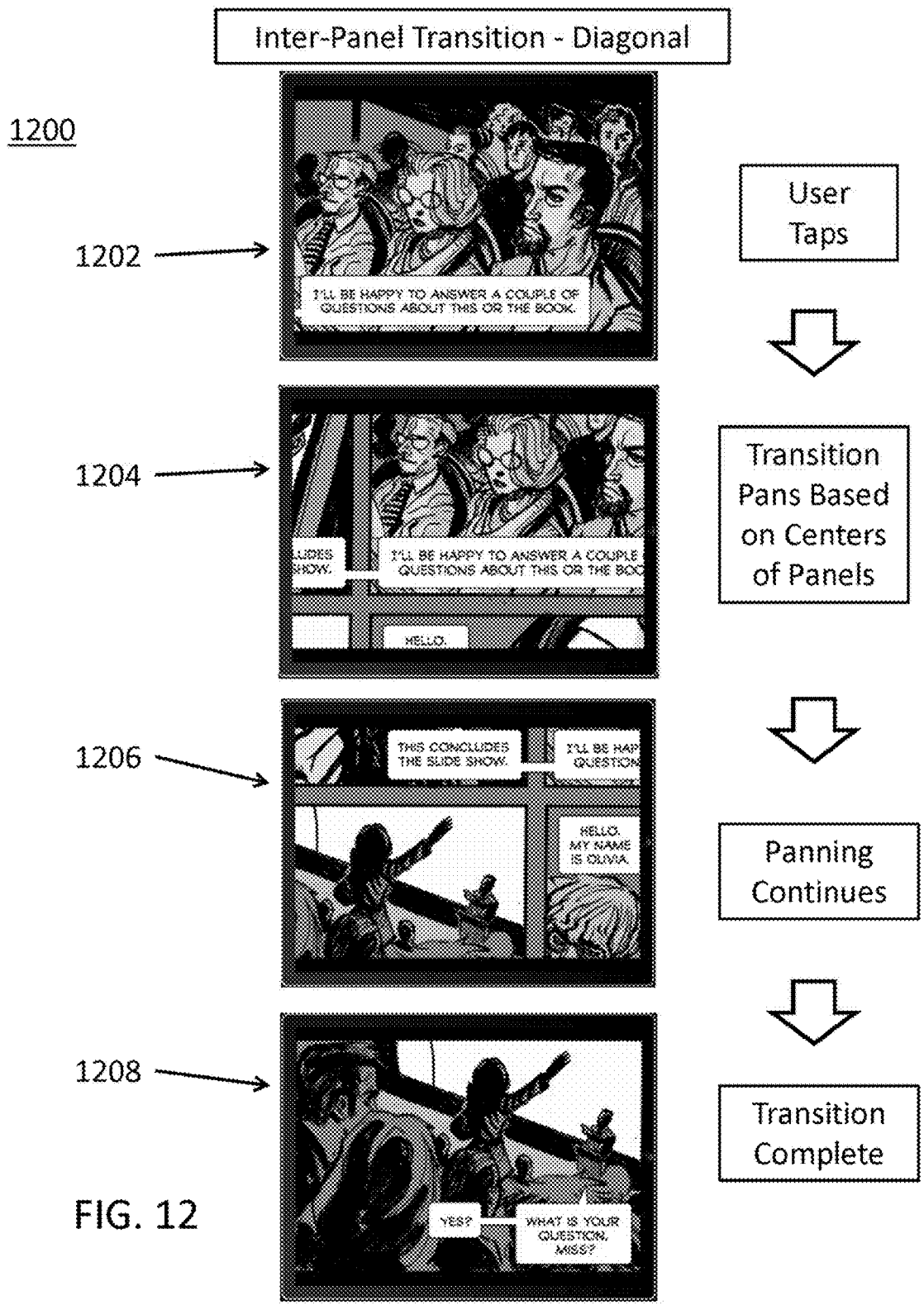
FIG. 12 is a diagram of yet another example of an inter-panel transition in accordance with some embodiments.

Yet another example of a transition between panels is shown in series 1200 of FIG. 12. As can be seen, this transition is between two panels diagonally located with respect to each other. After a user taps on a panel at 1202, the transition scales and pans between the beginning panel and the ending panel at 1204, 1206, and 1208. In some embodiments, the panning can occur along a line connecting the centers of the beginning panel and the ending panel.

Figure 13:
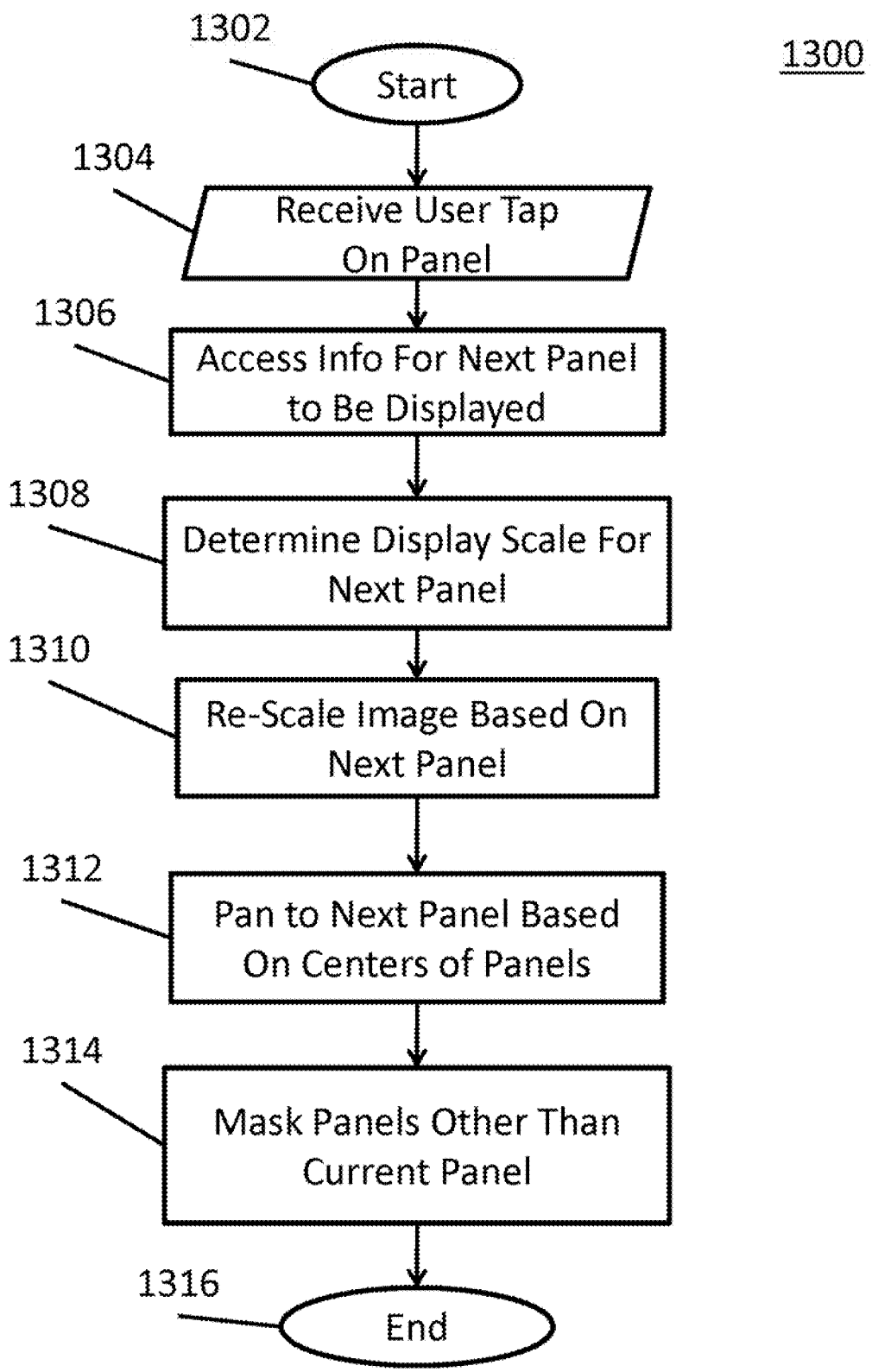
FIG. 13 is a diagram of a process for transitioning between panels in accordance with some embodiments.

Turning to FIG. 13, a process 1300 for transitioning between panels in accordance with some embodiments is shown. As illustrated, after process 1300 begins at 1302, a tap, or any other user indication, is received at 1304. This tap (or other user indication) can be received in any suitable manner. For example, with a touch screen reading device, the tap can be received in response to a user touching the screen of the reading device. As another example, with a reading device that includes a mouse or other pointing device, the tap can be received in response to the user click a button on the mouse or other pointing device.

Next, at 1306, information for the next panel to be displayed can be accessed. This information can be accessed from any suitable source. For example, the information can be accessed from a definition file, such as an XML file as illustrated in FIG. 3.

The scale for the new panel can next be determined at 1308. This display scale can be determined on any suitable basis. For example, the display scale can be determined based on the available display area on a screen, the orientation of the screen, making sure that the full content of a panel is displayed on the screen, balancing maximizing the percentage of the panel displayed against minimizing the amount of masking used, having a matte or margin of a certain amount of each side around the new panel, having a given amount of white space of one or more sides of the new panel, etc.

After the new scaling is determined, the displayed panel can be progressively re-scaled (e.g., by zooming to the new scale) at 1310. Any suitable speed for re-scaling can be used in some embodiments. At 1312, process 1300 can pan to the new panel based on the centers of the panels. Any suitable speed for panning can be use in some embodiments. In some embodiments, the re-scaling and panning in 1310 and 1312 can occur at the same time.

As the new panel becomes fully displayed, or after the new panel becomes fully displayed, the masking can be applied to adjacent panels that would be displayed due to the display size at 1314. Once the masking is applied, process 1300 can then end at 1316.

In some embodiments, the transition between some or all of the panels/sub-panels can be implemented without requiring user input. For example, in some embodiments, the transition between panels can occur without requiring that a user tap a panel. This can be implemented, for example, by waiting a specified and/or random amount of time before transition occurs.

In some embodiments, after the last panel on a page is displayed, a multi-panel view (e.g., as shown in FIG. 7) of the last panel and all of the panels of the page can be displayed. In this way, a user can see the entire page of panels upon completing viewing of the panels for a page. In order to display the multi-panel display of the page, a transition as described above may be made from the last panel to the entire page of panels, wherein the page of panels is treated as a panel for the purposes of re-scaling and panning. In some embodiments, the display of the multi-panel display after the last panel of a page is displayed can be disabled.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A device for presenting panel-based electronic documents, comprising:
   a display; and
   at least one processor programmed to:
   receive an electronic document comprising a page having multiple panels, the multiple panels including at least a first panel and a second panel;
   present the first panel on the display;
   determine a first masking to be presented with the first panel to at least partly obscure one or more panels of the multiple panels that are adjacent to the first panel, the first masking comprising at least one of a color or pattern;
   present the first masking on the display;
   determine that the first panel includes at least a sub-panel;
   present, on the display, a portion of the first panel that includes the sub-panel;
   present the second panel on the display;
   determine a second masking to be presented with the second panel to at least partly obscure one or more other panels of the multiple panels that are adjacent to the second panel, the second masking comprising at least one of a color or pattern; and
   present the second masking on the display.

2. The device of claim 1, wherein the at least one processor is further programmed to transition, according to a panel display order, from presenting of the second panel and the second masking to presenting a third panel and a third masking.

3. The device of claim 1, wherein the first panel is defined by a coordinate and a size.

4. The device of claim 1, wherein the one or more panels include the second panel, and the one or more other panels include the first panel.

5. The device of claim 1, wherein:
   the first panel is defined by at least a height and a width; and
   presenting the first panel comprises presenting the first panel on the display based, at least in part, on scaling at least one of the height or the width such that at least one edge of the first panel reaches an edge of the display.

6. The device of claim 1, wherein:
   the first panel is defined by a height and a width; and
   presenting the first panel comprises:
      presenting the first panel in a center of the display; and
      scaling at least one of the height or the width such that at least one edge of the first panel reaches an edge of the display.

7. The device of claim 1, wherein the at least one processor is further programmed to:
   determine an orientation of the display;
   present the first panel at a first scale that is based, at least in part, on the orientation; and
   present the second panel at a second scale that is based, at least in part, on the orientation.

8. The device of claim 1, wherein the at least one processor is further programmed to present the first panel at a scale that is based, at least in part, on a resolution of the display.

9. The device of claim 1, wherein the at least one processor is further programmed to present a multimedia animation during a transition from presenting the first panel to presenting the second panel.

10. A method for presenting panel-based electronic documents, comprising:
   receiving an electronic document comprising at least one page of content, the at least one page of content comprising a first panel displaying first content and a second panel displaying second content;
   presenting, on a display, the first content of the first panel;
   determining a first masking to be presented with the first panel to at least partly obscure one or more panels adjacent to the first panel, the first masking comprising at least one of a color or pattern;

presenting the first masking on the display;

determining that the first panel includes a sub-panel;

presenting, on the display, a portion of the first content of the first panel, the portion including the sub-panel;

presenting, on the display, the second content of the second panel;

determining a second masking to be presented with the second panel to at least partly obscure one or more other panels adjacent to the second panel, the second masking comprising at least one of a color or pattern; and presenting the second masking on the display.

11. The method of claim 10, wherein:

the first panel is defined by at least a height and a width; and presenting the first content of the first panel comprises presenting, on the display, the content of the first panel based, at least in part, on scaling at least one of the height or the width such that at least one edge of the first panel reaches an edge of the display.

12. The method of claim 10, wherein:

the first panel is defined by a height and a width; and presenting the first content of the first panel comprises:
  presenting the first panel in a center of the display; and
  scaling at least one of the height or the width such that at least one edge of the first panel reaches an edge of the display.

13. The method of claim 10, further comprising:

determining an orientation of the display;

presenting the first content of the first panel at a first scale that is based, at least in part, on the orientation; and presenting the second content of the second panel at a second scale that is based, at least in part, on the orientation.

14. The method of claim 10, further comprising presenting the first content of the first panel at a scale that is based, at least in part, on a resolution of the display.

15. The method of claim 10, further comprising presenting a multimedia animation during a transition from presenting the first content of the first panel to presenting the second content of the second panel.

16. The method of claim 10, further comprising:

presenting the at least one page on the display, wherein the second panel is presented using a first orientation on the at least one page; and determining a second orientation associated with the display, wherein presenting the second content of the second panel comprises presenting, on the display, and based at least in part on the second orientation, the second content of the second panel using a third orientation for the second panel, the third orientation being different than the first orientation.

17. The method of claim 10, wherein the sub-panel comprises a first sub-panel and the portion comprises a first portion, and wherein the method further comprises:

determining that the first panel includes a second sub-panel; and presenting, on the display, a second portion of the first content of the first panel, the second portion including the second sub-panel.

18. A non-transitory computer-readable medium containing computer-executable instructions that, when executed by a processor, cause the processor to perform a method for presenting panel based electronic documents, the method comprising:

receiving an electronic document comprising at least one page of content, the at least one page of content comprising a first panel displaying first content and a second panel displaying second content;

presenting, on a display, the first content of the first panel;

determining a first masking to be presented with the first panel to at least partly obscure one or more panels adjacent to the first panel, the first masking comprising at least one of a color or pattern;

presenting the first masking on the display;

determining that the first panel includes a sub-panel;

presenting, on the display, a portion of the first content of the first panel, the portion including the sub-panel;

presenting, on the display, the second content of the second panel;

determining a second masking to be presented with the second panel to at least partly obscure one or more other panels adjacent to the second panel, the second masking comprising at least one of a color or pattern; and presenting the second masking on the display.

19. The non-transitory computer-readable medium of claim 18, wherein the first panel is defined by a coordinate and a size.

20. The non-transitory computer-readable medium of claim 18, wherein:

the first panel is defined by at least a height and a width; and presenting the first content of the first panel comprises presenting, on the display, the first content of the first panel based, at least in part, scaling at least one of the height or the width such that at least one edge of the first panel reaches an edge of the display.

21. The non-transitory computer-readable medium of claim 18, wherein:

the first panel is defined by a height and a width; and presenting the first content of the first panel comprises:
  presenting the first panel in a center of the display; and
  scaling at least one of the height or the width such that at least one edge of the first panel reaches an edge of the display.

22. The non-transitory computer-readable medium of claim 18, the method further comprising:

determining an orientation of the display;

presenting the first content of the first panel at a first scale that is based, at least in part, on the orientation; and presenting the second content of the second panel at a second scale that is based, at least in part, on the orientation.

23. The non-transitory computer-readable medium of claim 18, the method further comprising presenting a multimedia animation during a transition from presenting the first content of the first panel to presenting the second content of the second panel.

* * * * *